United States Patent

Ehrat et al.

[11] Patent Number: 5,403,424
[45] Date of Patent: Apr. 4, 1995

[54] PROCESS FOR THE MANUFACTURE OF MULTI-LAYER COMPOSITES WITH SENSITIVE OUTER SURFACES

[75] Inventors: Rainer Ehrat; Reinhard Schlatter, both of Schaffhausen, Switzerland

[73] Assignee: Alusuisse-Lonza Services Ltd., Zurich, Switzerland

[21] Appl. No.: 65,874

[22] Filed: May 24, 1993

[30] Foreign Application Priority Data

Jun. 5, 1992 [CH] Switzerland .................. 1811/92

[51] Int. Cl.$^6$ .............................................. B32B 31/20
[52] U.S. Cl. .................................... 156/247; 156/323; 156/344
[58] Field of Search ................... 156/39, 45, 242, 245, 156/246, 247, 323, 288, 243, 344

[56] References Cited

U.S. PATENT DOCUMENTS

| | | | |
|---|---|---|---|
| 3,260,657 | 7/1966 | Hogan | 156/323 |
| 3,841,942 | 10/1974 | Carlson et al. | 156/323 |
| 4,295,907 | 10/1981 | Cordts et al. | 156/246 |
| 4,362,585 | 12/1982 | de Antonis et al. | 156/313 |
| 4,824,506 | 4/1989 | Hoerner et al. | 156/323 |
| 4,824,509 | 4/1989 | Tonoki et al. | 156/323 |
| 4,994,133 | 2/1991 | Oizumi et al. | 156/323 |

FOREIGN PATENT DOCUMENTS 0063395 10/1982 European Pat. Off. .
0067060 12/1982 European Pat. Off. .
0150816 8/1985 European Pat. Off. .

*Primary Examiner*—Caleb Weston
*Attorney, Agent, or Firm*—Bachman & LaPointe

[57] ABSTRACT

The invention relates to a process for protecting sensitive surfaces from mechanical and physical effects, in particular the effects of pressure and/or heat, whereby the surfaces are covered by a protective layer during the application of pressure and/or heat. The protective layer is a thermoplastic or elastic plastic that is molten, plastic or elastic under the conditions of applied pressure and/or heat, and has a lower resistance to deformation than the surface to be protected.

10 Claims, 2 Drawing Sheets

PROCESS FOR THE MANUFACTURE OF MULTI-LAYER COMPOSITES WITH SENSITIVE OUTER SURFACES

BACKGROUND OF THE INVENTION

The present invention relates to a process for manufacturing multi-layer composites with sensitive outer surfaces and to a process for protecting sensititive outer surfaces from mechanical and physical effects, in particular the effects of pressure and/or heat, whereby the sensititive surfaces are covered by a protective layer during the application of pressure and heat.

Known, for example from EP 0 423 074, is the manufacture of multi-layer composites having a core layer of thermoplastic material with an outer layer of metal on both sides. The core layer and the outer layers are joined together permanently in a continuous process under pressure between two rolls at elevated temperature. The composite can be coated with a protective film.

The protective film, which is intended to protect the final product until its final stage of processing, can advantageously be deposited on the outer surface of the composite in a single lamination process. During the processing of the layers into a composite, the surfaces of the, possibly lacquered, polymer-coated, or otherwise treated, outer layers of plastic or metal are exposed to demanding conditions resulting from the effects of pressure and heat. Protective films are not capable of protecting the surface from harmful effects at all times. Discoloration of the surface can result, or the surface can be damaged as a result of mechanical effects.

The object of the present invention is to propose a process which enables optimal joining of the individual layers to be achieved under free choice of the parameters of heat and presssure without detriment to the outer surfaces of the outer layers.

SUMMARY OF THE INVENTION

That object is achieved by way of the invention in that the protective layer is in the form of a plastic or elastic coating of a thermoplastic or elastic plastic that is molten under the conditions of presssure and heat and/or an adhesive layer on a substrate, and the protective layer exhibits a lower resistance to change of shape than surface to be protected.

At least in the cold condition i.e. at room temperature and without application of pressure, i.e. under normal pressure, the protective layer is usefully in the form of a plastic film.

For carrying out the process of joining the the various layers into a multi-layer composite one can employ for example pressing processes involving pressing between plates or pressing between rolls and/or strips. Strip type presses are advantageous.

The process according to the present invention has e.g. in the case of strip presses the advantage that by the formation of a viscous to viscoelastic film, that creates a sliding behavior between the pressing strip and the incoming outer layers, the outer layers can be easily straightened and run through the press free of stress.

BRIEF DESCRIPTION OF THE DRAWINGS

FIGS. 1 and 2 describe, illustratively and as an example, an application possibility for the process according to the invention. These show in:

FIG. 1—a side view of a device for continuously manufacturing composite laminates;

FIG. 2—a side view through part of a composite laminate; and

DETAILED DESCRIPTION OF PREFERRED EMBODIMENTS

Figures 1, 2:
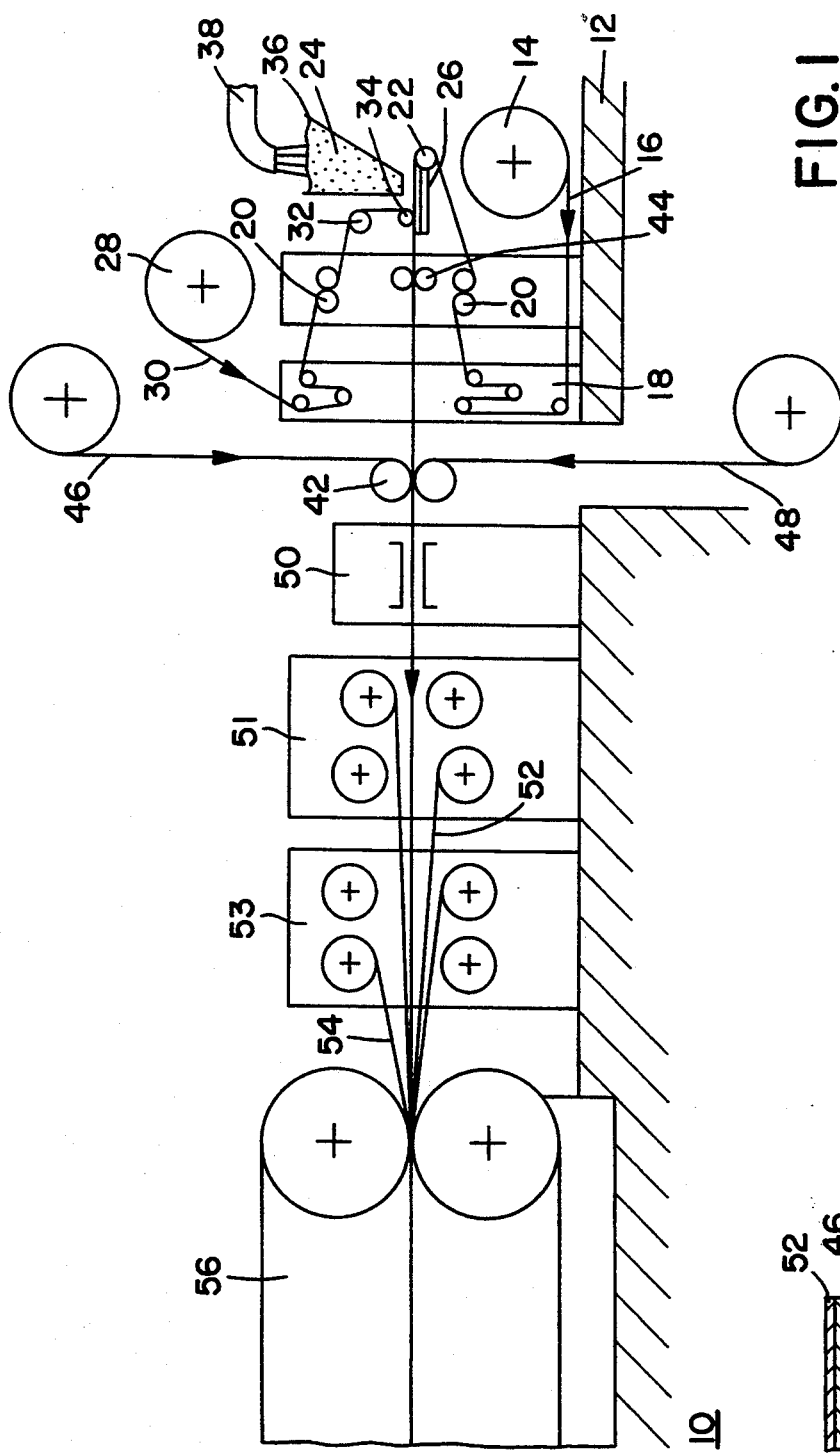

Multi-layer composites can for example contain a core layer of organic materials. The core layer can e.g. contain a core mixture featuring filler materials, lightweight additives, binders, flame-retardents and/or processing agents etc. Outer layers can be present on one or both sides of the core layer.

As organic materials one can employ e.g. plastics such as duroplastics or elastomers. The plastics mentioned can if desired also be foamed and/or contain reinforcing materials such as fibers, webbing or weaves out of glass, carbon, organic, natural or synthetic materials. Examples of suitable thermoplastics are polyolefins, such as polyethylene, or polyvinyl compounds such as PVC.

Suitable filler materials for the core mixture, constituting for example 60–95 wt. %, are inorganic materials that are usefully fire-resistant and/or are pourable; such materials are of the type aluminum tri-hydroxide, $Mg(OH)_2$, $CaCO_3$ or magnesium carbonate hydrate that, on heating, release the chemically bonded water and/or carbon dioxide or e.g. antimony oxide for chlorine containing plastics.

The binding agent, which can preferably amount to 5–40 wt. % of the core mixture, can be organic or inorganic. The organic binder can be either duroplastics or thermoplastics. After curing, duroplastics are hard and brittle or elastic; thermoplastics do not change their elasticity after processing. Preferred durolastic binders are phenolic resins, polyurethane resins, or polyisocyanurate resins that exhibit low combustibility and generate little smoke. If thermoplastics binders are employed, polyolefins such as polyethylene are preferred.

Phosphates, cements, portland cements, calium aluminates, plaster, alkaline silicates etc can be employed as inorganic binders.

Light weight addititives are e.g. lava slags, pumice, addititives of clay, clay slate, flue dust, waste products that have been processed into granulate form and are blown up by vaporizing the water content expanded clay, hollow spherical corundum, coal cinder, brick fines, vermiculites, perlites, expanded mica, expanded perlite, kieselguhr, foamed sand, foamed grit, hollow glass spheres, foamed glass, etc.

As a rule the outer layers are of metal and 0.05 to 4 mm thick. The metal outer layers can be of foil or sheet and, depending on the pressing process, can be continuous or of cut lengths. Ferrous or non-ferrous metals can be employed. For example foils, coils or sheet of iron, zinc coated iron, steel, zinc, copper, bronze, aluminum, aluminum alloys etc can be employed.

The outer layers of metal can feature decorative layers and/or surface treatment layers, if desired with special surface structure, texture topography etc. The decorative layers can for example be lacquer coatings, printed, colored or embossed films of plastic or cellulose containing materials and composites. Convened coatings can be for example layers deposited by anodizing, vapour deposition, sputtering, or layers created by plasma coating, flame spraying or electron beam deposition e.g. ceramic or other kinds of inorganic layers. Also decorative metal foils e.g. for reflection effects can be employed.

Also, outer layers of polymers such as PVC, polyolefins, polyacrylates, phenolics, melamine resins etc non-reinforced or reinforced with fibers of glass, polymers or natural products, with or without surface structures can be procesed together with core layers into multi-layer composites. It is also possible to provide a different outer layer on each side of the multi-layer composite.

The object of the present invention is to protect the outer i.e. visible sides of the outer layers that are part of the multi-layer composite.

Multi-layer composites can also be manufactured featuring, for example as core, a middle layer of metal or plastic, in strip, foil or film form or of paper, pulp sheet or the likes, and on each side of the middle layer a core layer and finally on top of these core layers outer layers e.g. of metal.

Further varients are possible, for example versions having foamed organic material as core layers.

The make-up of the laminate between the outer layers can be selected to meet the requirements encountered in practice so that accordingly multi-layer cores are conceivable.

The layers can be self-bonding to each other, in particular under the application of presssure and/or temperature. Binders may be provided between individual or all layers. Such binding agents may be plastic films such as sealing films, adhesive strips or the like. Other binders are adhesives which are sprayed or brushed on. By means of these self-adhesive layers, or the adhesives, the individual layers can be bonded permanently together.

One example of a process for manufacturing a composite is described in EP 0 423 074.

The coatings employed in the process according to the invention usefully lie in the molten, plastic or elastic condition at pressures of 1 to 50 bar and temperatures of 100 to 250 deg. C.

Preferred are coatings whose shear modulus, determined in accordance with DIN 53445 and expressed with temperature dependance of the shear modulus and in $Pa \times 10^8$, lies below a curve defined by the shear modulus values $0.7 \, Pa \times 10^8$ at 10 deg. C., $0.5 \, Pa \times 10^8$ at 30 deg. C., $0.3 \, Pa \times 10^8$ at 50 deg. C., $0.1 \, Pa \times 10^8$ at 100 deg. C., and falling asymptotically towards zero above 150 deg. C., as shown in FIG. 3.

Figure 3:
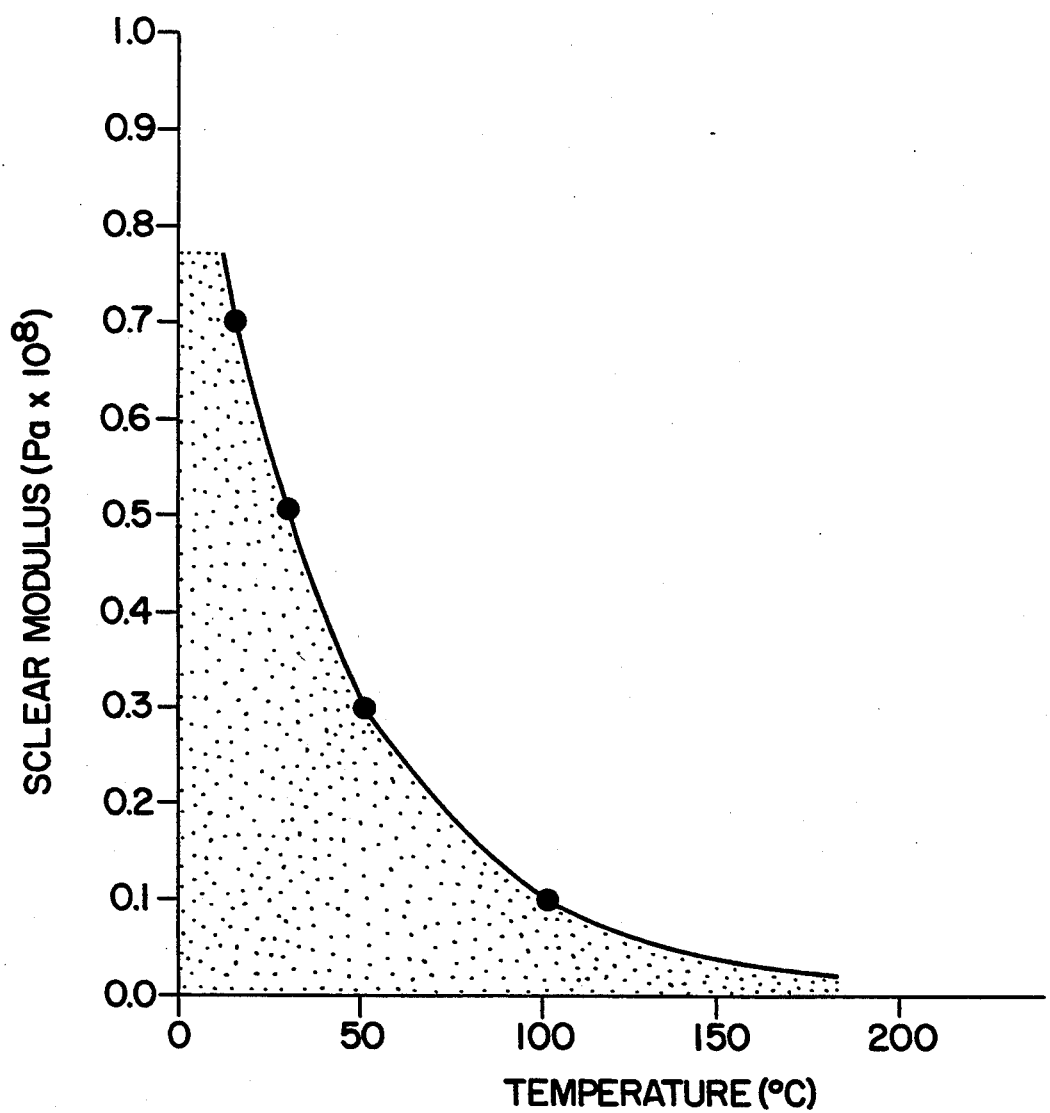
FIG. 3—a graph indicating temperature versus shear modulus properties of a material comprising a protective layer of the composite laminant.

FIG. 3 illustrates this preferred shear modulus as a function of temperature. Protective layers with shear modulus values in the shaded range can be used preferentially.

Likewise preferred are coatings of elastomers having a hardness at 100 to 250 deg. C. of less than 60 Shore A units and in particular between 10 and 30 Shore A units.

The thickness of the coatings and in particular film type coatings can be of e.g. 10 μm to 250 μm, and usefully from 12 μm to 100 μm.

The coatings can be of a thermoplastic from the series of the polyolefins, polyacrylates, polyesters, polymers of vinyl compounds with or without plasticizer additive, or of elastomer plastics or contain these plastics.

Examples of coatings, in particular coatings from the polyolefin series are polyethylene e.g. high density polyethylene (HDPE, density greater than 0.944 g/cm³), medium density polyethylene (MDPE, density 0.926-0.940 g/cm³), linear medium density polyethylene (LMDPE, density 0.926-0.940 g/cm³), low density polyethylene (LDPE, density 0.910-0.925 g/cm³), and linear low density polyethylene (LLDPE, density 0.910- 0.925 g/cm³), polypropylene, atactic, isotactic, amorphous and crystalline polypropylene, and any desired mixtures thereof, poly-1-butene, poly-3-methylbutene, poly-4-methyl-pentene and copolymers thereof such as e.g. copolymers of polyethylene with vinyl acetate, vinyl acetate and acrylic esters, vinyl-alcohol, acrylic acid, e.g. ionomer resins, such as copolymers of ethylene with about 11% acrylic acid, methacrylic acid, acrylic esthers, methacrylic esthers, tetrafluorethylene or polypropylene and random copolymers, block copolymers, or olefin polymer/elastomer mixtures. Polyethylenes and polypropylene are preferred.

Thermoplastics from the polyester series are for example polyalkylene terephthalates or polyalkylene isophthalates containing alkylene groups or radicals having 2-10 carbon atoms or alkylene groups containing 2-10 carbon atoms that are interrupted by at least one —O—, such as, for example polyethylene terephthalate, polypropylene terephthalate, polybutylene terephthalate, polypropylene terephthalate (polytetramethylene terephthalate), polydecamethylene terephthalate, poly-1.4-cyclohexyldimethylol terephthalate or polyethylene-2.6-napthalene-dicarboxylate or mixed polymers of polyalkylene terephthalate and polyalkylene isophthalate whereby the fraction of isophthalate amounts e.g. to 1-10 Mol %, mixed polymers and terpolymers, and block polymers and grafted modifications of the above mentioned substances.

Expedient ester-based thermoplastics are polyalkylene terephthalates containing alkylene groups or radicals having 2-10 carbon atoms and polyalkylene terephthalates containing alkylene groups or radicals having 2-10 carbon atoms interrupted by one or two —O—.

Preferred esther-based thermoplastics are polyalkylene terpehthalates with alkylene groups or radicals with 2 to 4 carbon atoms and very strongly preferred are polyethylene terephthalates.

By way of example of plastics from the series of polymers of the vinyl compounds, mention can be made for example of polyvinylester, polyvinyl alcohols, polyvinyl acetals, polyvinyl ethers or polymers of N-vinyl lacatams and vinyl amines or halide-containing vinyl polymers.

Examples of polyvinyl esthers are homopolymers of polyvinyl acetate and copolymers of vinyl acetate, such as vinyl acetate/dibutylmaleinate, vinyl acetate/n-butylacrylate, vinyl acetate/2-ethylhexylacrylate, vinyl-acetate/n-butylacrylate/N-hydroxy-methyl acryl amide, vinylacetate/VeoVa-10 vinyl acetate/ethylene or vinyl acetate/vinyl laurate, homopolymers of and copolymers of vinyl propionate, such as vinyl proprionate/tertbutylacrylate copolymers.

Examples of polyvinyl alcohols range from fully saponified types up to products having hydrolysis grades of about 70%, saponified products of copolymers of vinyl acetate/ethylene etc.

Examples of polyvinyl acetals are polyvinyl formal and polyvinyl butyral.

Examples of polyvinyl ethers are homopolymers of of methyl, ethyl, isobutyl, decalyl and octadecyl vinyl ether and copolymers e.g. of vinyl ethers and maleic acid anhydride.

Examples of polymers of of N-vinyl acetams and vinyl amines are polyvinylpyrrolidon and polymers of N-vinyl piperidon and N-vinyl caprolactam.

Examples of polyvinylamines are polymers of the N-vinyl carbazole and polyvinyl imidazole.

Examples of elastic plastics or elastomers are mixed polymers or copolymers or grafted polymers containing a fraction of diene, urethane, acrylate, siloxane, epichlorophydrin, isobutylene, butadiene, isoprene or chloroprene compounds.

As a rule the coatings are employed in film form. The plastics can be processed to films using generally known methods. The films are deposited batch-wise or preferably continuously onto the surface to be protected. In a continuous process the coating can be deposited on the surface to be protected at any place in the process before the pressing stage. The surface to be protected can be pretreated in advance with an adhesive or bonding agent and/or the coating film can be pretreated with an adhesive or bonding agent. The pretreatment may take the form of spray deposition, scraping on, brushing on, etc. of the adhesive or bonding agent. An adhesive or bonding agent may also be sprayed between the outer layers and protective layer just prior to the coating stage.

Suitable adhesives or bonding agents are e.g. cautchuc or acrlylic bonder based on polychloroprene, styrol-butadiene, nitrile, polacrylate, polymethylacrylate, acrylic esther, polyvinyl ether or polyisobutene that have been dissolved in organic solvents with additives of phenolic resins, hydrocarbon resins or colophonium resin, or dispersed in water. After deposition of a thin layer of the adhesive or bonding agent, the fluid phase can be removed.

It can be advantageous for the protective layer to be an adhesive layer on a supportive layer i.e. for example a film of thermoplastic, as described above, or a film of metal or cellulose-containing, laminar materials such as papers, pulp sheet or cardboard and an adhesive layer, as described above. The thickness of the adhesive layer can for example lie in the range of 2–50 μm, advantageously 5–10 μm. The adhesive layer then comes into contact with the surface of the outer layer to be protected and the film or cellulose containing, laminar material into contact with the pressing tool or strip. With such a combination, the adhesive, the protective layer with the required properties and the film or cellulose-containing materials can act as a carrier.

Preferred are processes according to the present invention in which the protective layers comprise a film containing polyolefins or polyesters and an adhesive layer, examples of such materials being given above.

During the process of joining the layers into the form of a multi-component composite in a compression facility, e.g. a strip press, the protective layer and in particular the protective film lying between the surface to be protected and the pressure tool, e.g. pressure strip, is subjected to pressure and as a rule a thermal cycle of heating and cooling. The protective layer takes on the shape of the surface to be protected and protects the surface from e.g. pressure peaks arising from unevenness of the pressure device or composite position, irregularities in the surface texture or topography, trapped air that causes the e.g. metatllic surfaces to oxidize. Unevenness, mechanical damage on the pressure tool or pressure strip, or foreign bodies such as impurities that could be transferred by the action of pressure onto the surface to be protected, are effectively intercepted by the protective layer.

The protective layer or parts thereof having shear modulas versus temperature properties as shown in FIG. 3, reach a molten, plastic or elastic condition as a result of the action of heat and/or under the action of pressure, and form thereby a layer of low shear strength or a sliding layer that has a very low coefficient of friction and is easily penetrated (good formability) by surface structures, pressure peaks, and/or foreign bodies. Consequently, during the said processes involving the action of pressure and/or temperature, the surfaces to be protected are protected from damage due to different thermal expansion and/or friction and/or foreign bodies between the surfaces applying the pressure and the surfaces to be protected. Preferred is the use of the protective layer/layers on both sides of the multi-layer composite, and in particular the protective film/films in a double-belt press.

After permanently joining together the individual layers of the composite, e.g. after treatment in a strip press, the protective film can be removed. If a protective film has been used, this can be pulled off and if desired rolled up. The protective film can e.g. by melting and extrusion, be processed into a new protective film or another kind of film. Rolled up protective film may if desired also be returned to the start of the production line and be deposited on the sensitive surface that is entering the press.

The protective layer may also be left on the surface and thus afford it temporary or permanent protection beyond the production process itself.

The main parts of the device shown in FIG. 1 are supported by foundations 10 and a base plate 12.

A lower adhesive film 16 is unwound from a lower spool 14 and led over a film tension regulator 18, a broad drawing roll 20 and deflection roll 22 into an approximately horizontal plane in the region where it meets up with the homogenous core mixture 24. In this region the lower adhesive film 16 makes sliding contact with, and on top of, a scraping table 26.

An upper adhesive film 30 is unwound from an upper spool 28 and likewise guided over a film tension regulator 18, a broad drawing roll 20, deflection roll 32 and scraping beam 34 or sheet.

An automatic measured-feed facility 36 feeds core mixture 24, continuously or in small portions, onto the lower adhesive film 16. The measured-feed facility 36 is fed from a supply line 38.

Two tension drive rolls 42 draw the adhesive films 16, 30 through the wedge-like gap in the region of the scraping beam 34, whereby the pourable core mixture 24 is drawn along too, and is compressed for the first time. A further compression takes place between the precompression rolls 44.

Deflected by the tension drive rolls 42 are an upper outer strip 46 and a lower outer strip 48 which are pressed against the adhesive films 16, 30 together with core mixture 24, whereby the core mixture is again compressed.

The continuous composite runs first through a strip preheating facility 50, then through a mill 51 featuring rolls of a protective film 52 and a mill 53 featuring rolls of paper strip 54 and on to a double-belt press 56. There the composite of precompressed core mixture 24, the adhesive films 16, 30 outer strips 46, 48, protective films 52 and if desired paper strips 54, is pressed together, heated, held at temperature, cooled and finally, after the double-belt press 56, cut to final size.

After leaving the strip press (not shown in FIG. 1), the protective film can either be left on the the composite for temporary or permanent protection, or it can be removed e.g. by peeling off the composite and recoiling. Re-using the film after removal for the same or similar purpose is also possible.

A composite laminate 86, shown in part in FIG. 2, shows the core layer, of highly compressed, hardened core mixture 24, with the two outer strips 46, 48 elastically adhering to it. The outer strips 46, 48 are covered with protective films 52. The adhesive films are no longer visible as such.

We claim:

1. A process for the manufacture of multi-layer composites having a sensitive outer surface and for protecting the sensitive outer surface from mechanical and physical defects, comprising the steps of:

providing a protective layer on an adhesive layer comprising a carrier on an adhesive layer, wherein the carrier is a plastic material having shear modulus values falling below a curve defined by the shear modulus values 0.7 Pa×$10^8$ at 10° C., 0.5 Pa×$10^8$ at 30° C., 0.3 Pa×$10^8$ at 50° C., 0.1 Pa×$10^8$ at 100° C., and falling asymptotically towards zero above 150° C. under at least one of the conditions of pressure and heat, wherein the protective layer exhibits a lower resistance to deformation than the sensitive outer surface being protected;

covering the sensitive outer surface with said protective layer on said adhesive layer during the application of pressure and heat, wherein the adhesive layer is in contact with the surface to be protected; and shielding the sensitive outer surface from said heat and pressure and the consequential mechanical and physical effect thereof via said protective layer on said adhesive layer during the step of covering and creating a sliding layer on said sensitive outer surface.

2. The process according to claim 1, wherein said protective layer, in a cold condition and without the application of pressure, is in the form of a plastic film.

3. The process according to claim 1, wherein the protective layer is at least one of molten, plastic and elastic at pressures of 1 to 50 bar and temperatures of 100 to 250° C.

4. The process according to claim 1, wherein the thickness of the protective layer is 10 μm to 250 μm.

5. The process according to claim 1, wherein the protective layer contains at least one thermoplastic from the group consisting of polyolefins, polyacrylates, polyesters, and polymers of vinyl compounds.

6. The process according to claim 5, wherein the thermoplastic contains a plasticizer additive.

7. The process according to claim 1, wherein the protective layer contains at least one elastic plastic.

8. The process according to claim 1, wherein the protective layer comprises a film containing at least one of polyolefins and polyesters, and an adhesive layer.

9. The process according to claim 1, wherein the multi-layer composite includes a plurality of sensitive surfaces which represent the outer layers of a multi-layer composite and the effects of pressure and heat are applied to permanently join together and form said composite of at least three layers, wherein at least one protective layer is deposited on each of the plurality of sensitive surfaces prior to the application of pressure and heat, further including the step of removing each of the protective layers in the form of a film after the application of pressure and heat.

10. The process according to claim 1, wherein the protective layer is at least one protective film employed in a double-belt press.

* * * * *